Richard W. Hyde
Stanley V. Margolin
INVENTORS

United States Patent Office 3,211,524
Patented Oct. 12, 1965

3,211,524
PROCESS FOR TREATING FERRUGINOUS ALUMINUM-BEARING ORES
Richard W. Hyde, Lexington, and Stanley V. Margolin, Auburndale, Mass., assignors to Arthur D. Little, Inc., Cambridge, Mass., a corporation of Massachusetts
Filed Jan. 29, 1964, Ser. No. 341,021
12 Claims. (Cl. 23—141)

This application is a continuation-in-part of our application Serial No. 46,471 filed August 1, 1960 and now abandoned.

This invention relates to a method for obtaining high purity aluminia from iron-bearing aluminum sources. In particular this invention relates to the treatment of ferruginous aluminum-bearing ores to recover both the aluminum and iron values by a process which permits eliminating the commonly used Bayer process for producing high-grade alumina suitable for use directly in electrolytic cells.

So-called ferruginous aluminum sources, either bauxites or clays, are known to be available in large quantities as naturally occurring ores. The quantity of both the iron and the aluminum in these ores is such that it may be desirable to be able to recover both of these metals. This in turn presents a problem of not only isolating the iron and aluminum values, but also of quantitatively separating them, thus permitting the iron or iron oxide and alumina obtained to be further processed by standard techniques.

Ores high in iron content, but relatively low in gangue materials, are commonly handled by reduction in a blast furnace. A more recently developed technique, the fluidized bed process, is also available for iron reduction. Ores rich in alumina, but low in oron, such as the bauxites are usually treated by the so-called Bayer process which includes first forming sodium aluminate, hydrolyzing the sodium aluminate with water in the presence of $Al(OH)_3$, and then calcining to $Al_2O_3$. Alternatively, the aluminum ore may be reacted with $H_2SO_4$, formed into an alum, and then calcined. Little has been done, however, on the treatment of the ferruginous aluminum bearing ores from which it is desirable to recover both iron and aluminum in useable forms; and hence there is no existing commercial process for handling these ores.

It is therefore an object of this invention to provide a method for handling ferruginous aluminum-bearing ores which permit substantially quantitative recovery of both the iron and aluminum values without contaminating either of them with the other. It is another object to provide a method of the character described which permits recovery of $Al_2O_3$ of such purity that it can be used directly in a Hall cell, as well as the recovery of iron as Fe or $Fe_3O_4$. Another object is to provide a process of the character described which is adaptable to large-scale commercial practice and which is economically feasible. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

For a fuller description of the method of this invention reference should be had to the accompanying drawings in which FIG. 1 is a flow diagram showing the reduction of the iron in the ore and subsequent removal of a major portion of the iron values from the ore;

The flow diagrams of the figures illustrate alternative ways in which some of the steps may be carried out.

The method of this invention may be broadly defined as one which comprises the steps of heating to break alumina-silicate bonding and reduce the iron to a magnetic form, magnetically separating out substantially all of the iron thereby to leave a leaching plant feed containing the aluminum values and some residual iron, leaching the plant feed with aqueous nitric acid to solubilize the aluminum to form an aluminum nitrate solution containing at least a portion of the residual iron, removing the residual iron from the aluminum nitrate solution, and decomposing the resulting iron-free aluminum nitrate to form aluminum oxide and off-gases which may be used to form a portion of the nitric acid required.

It will be convenient to discuss the process of this invention step by step with reference to the figures.

*Breaking alumina-silicate bonding and reducing and separating the iron*

Figure 1:
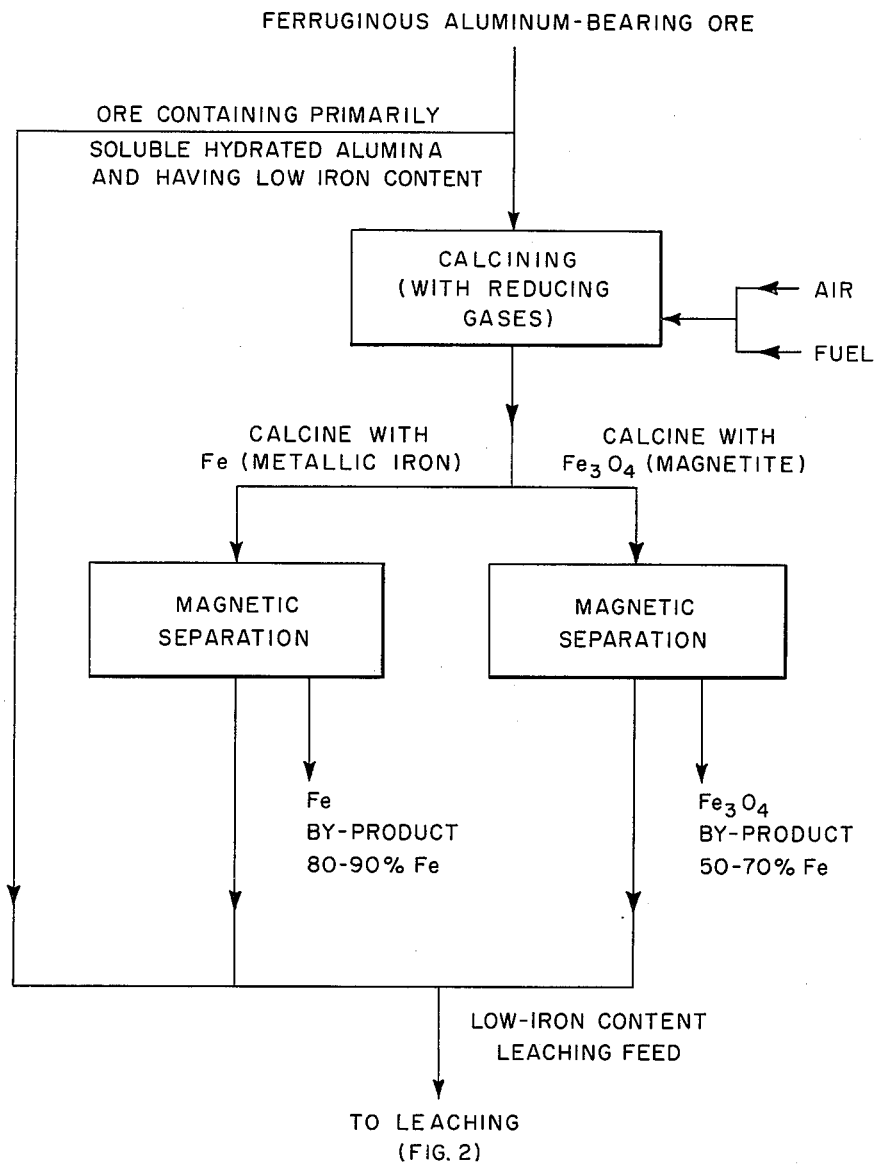

These steps are illustrated in FIG. 1.

In most ferruginous aluminum-bearing ores the aluminum, as alumina, is tightly bonded to silicates and the iron is in its highest oxidized state, $Fe_2O_3$, which is not magnetic. Since the alumina is to be dissolved in nitric acid and the major portion of the iron is to be separated magnetically, the alumina-silicate bond must be broken and the iron reduced to a magnetic form. These are accomplished by heating and exposing the ore to reducing gases, respectively. It is, of course, possible to effect the breaking of the alumina-silicate bonding reduction of the $Fe_2O_3$ in separate steps, but since both results can readily be obtained in a single calcining step by supplying reducing gases, this single step is preferred.

Calcining of the ore to break the alumina-silicate bonding is carried out at a temperature between about 700 and 850° C. Any prolonged heating above 850° C. will cause the formation of the insoluble alpha aluminum; and if heating is carried out at temperatures greatly in excess of 850° C. the alumina will flux with the silica to produce an aluminum silicate which is even more difficult to leach than the unwanted alpha alumina. Heating below about 700° C. will not achieve the necessary degree of bond breaking and hence will result in low alumina yields.

This heating is preferably carried out in a fluidized bed (see for example U.S. Patent 2,711,368). This apparatus achieves the best temperature control over the temperature range required. However, any other gas-solid contacting equipment which permits the requisite temperature control, e.g., a rotary kiln or a shaft kiln, may also be used. The residence time or time of heating at the required temperature will depend upon the ore being treated, that is upon the time required to effect the disruption of the alumina-silicate bonding and the reduction of the iron. Residence times generally may range from 2 to 10 hours.

It is preferable if the ore contains an appreciable quantity of iron, e.g., more than about 3%, to remove as much of this iron prior to the leaching of the alumina. Although there are several techniques available for removing iron, magnetic separation of the major portion of the iron is the most practical. For example, flotation could be used but it is economically prohibitive because of the very high surface area involved which in turn would mean an excessively large consumption of flotation reagents. It is therefore necessary to reduce the iron present in the ore to a magnetic form, i.e., to $Fe_3O_4$ or to Fe.

As noted above, this reduction is conveniently accomplished simultaneously with the breaking of the alumina-silicate bonding. Generally, the liberation of iron through reducing to a magnetic form is better accomplished by reduction of the iron, primarily in the form of $Fe_2O_3$, to Fe. However, this involves more severe reducing conditions and generally results in higher fuel consumption and the heating of the ore at higher temperatures within the specified range than if the iron is reduced to $Fe_3O_4$. Thus the choice of reducing the iron to Fe or $Fe_3O_4$ will depend upon the ore, the operating conditions, and the economics involved. However, in any case in the method of this invention it is desirable to convert as much of the iron as possible to either $Fe_3O_4$ or Fe to achieve as complete separation as possible by subsequent magnetic separation.

The reducing gases used will of course depend upon the extent to which the iron is reduced and will be those commonly employed. For example, if the final magnetic iron form is to be $Fe_3O_4$ then weakly reducing gases will be used; while if the final magnetic iron is to be Fe then strongly reducing gases high in CO and $H_2$ will be used.

In using the fluidized bed technique the ore to be introduced into the fluidized bed should range in particle size from about one-fourth inch to that which will pass a standard 200-mesh sieve. The particle size distribution suitable for operation in a fluidized bed will be determined by the extent to which the iron contained in the ore is to be reduced. Thus, if complete reduction to metallic iron is to be achieved, the particle size is relatively important and the ore feed material is preferably sized about minus 8-mesh with a minimum of fine material (e.g., minus 325-mesh). If the iron is to be reduced to $Fe_3O_4$, the particle size is less important and the ore feed may be sized somewhat larger, e.g., 4-mesh and smaller.

The fluidized bed is established by blowing up through the bed of ore particles the required gases; and the velocity of the gas stream is controlled with reference to the particle sizes of the ore or reduced material to set up a fluidized bed condition in which the particles are dispersed or suspended in the gas stream without excessive entrainment and carry over of the solid particles in the gases leaving the zone of solid suspension. In keeping with fluidized bed practice, the lower gas stream velocities and used for the smaller particle sizes. In the treatment of the ferruginous aluminum-bearing ores in accordance with this invention, the velocity of the gas stream will range between about 0.5 to 3 feet per second. The treated ore is normally discharged continuously by overflow from the fluidized bed, but in the case of fines, the produce may pass into the cyclone and be removed from there. The hot reduced ore particles from the fluidized bed are then preferably cooled and ground (either in a wet or dry state) to reduce the average particle size to achieve the most complete magnetic separation as readily as possible. The particle size range must be so adjusted as to liberate the iron for subsequent separation.

The magnetic separation of the iron is accomplished by well known techniques and may be accomplished either wet or dry. If the iron has been reduced to metallic iron, the by-product iron resulting in the magnetic separation will be from 80 to 90% Fe; whereas if it is reduced to $Fe_3O_4$ the by-product iron will be from 50 to 70% Fe.

The Fe or $Fe_3O_4$ by-product obtained in the magnetic separation is available for processing by well-known techniques. For example, if it is metallic Fe, it may be treated as described in U.S. Patent 2,894,831. If it is reduced only to $Fe_3O_4$, it may be agglomerated and then fed directly into a blast furnace for further reduction to pig iron.

As shown in FIG. 1 it may be possible to eliminate the heating of the ore provided that the iron content, Fe basis, is less than about 3% and that most of the aluminum is present in the form of free hydrated alumina. When only a minimum quantity of iron is present then all of it may be removed as residual iron from the leach liquor; and if most of the aluminum is present as free hydrated alumina it may be dissolved directly in nitric acid without heating.

Leaching to form aluminum nitrate solution

Figure 2:
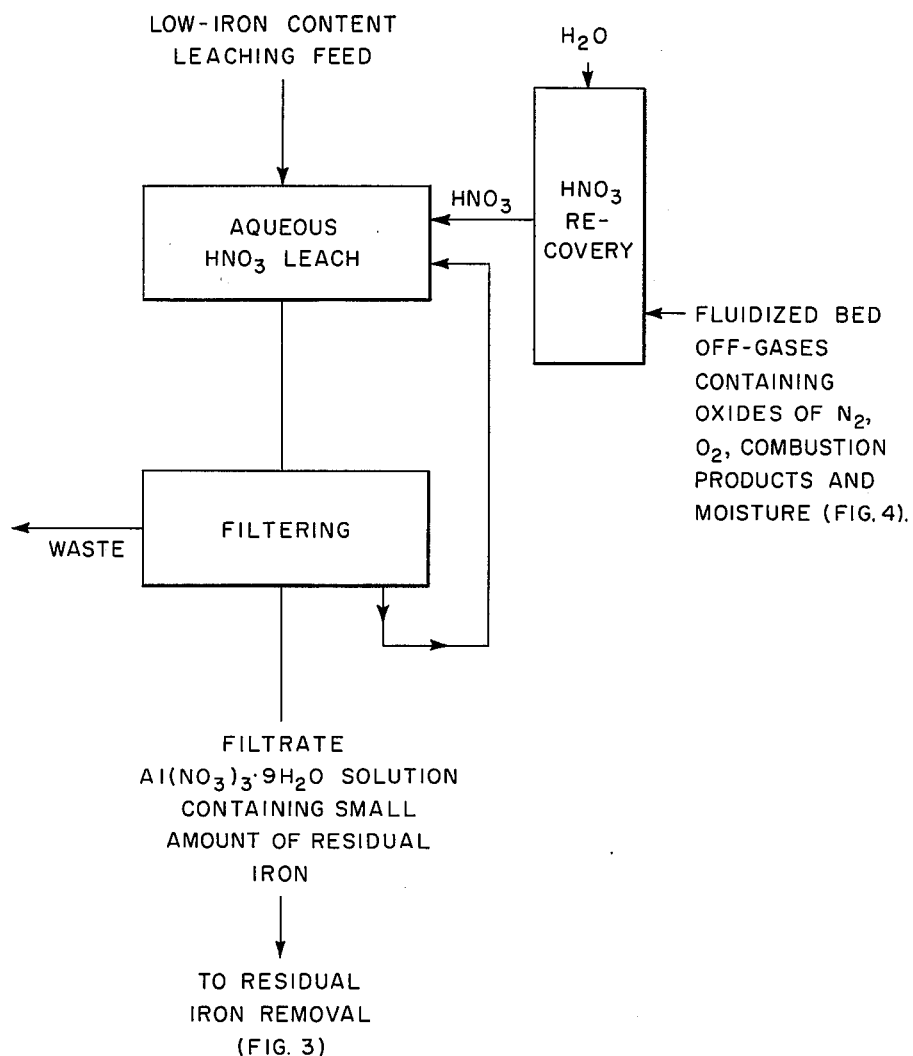
FIG. 2 is a flow diagram illustrating the aluminum leaching portion of the process.

After substantially all of the iron values in the ore have been magnetically separated and removed as either Fe or $Fe_3O_4$, the low-iron content leaching feed which remains is treated to recover the aluminum values contained therein. This leaching process is illustrated in FIG. 2.

Leaching of the aluminum values is accomplished by dissolving the alumina in aqueous nitric acid to form a solution of the ennea hydrate of aluminum nitrate $$(Al(NO_3)_3 \cdot 9H_2O)$$

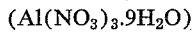

containing a small amount of dissolved iron.

The aqueous nitric acid leaching liquid used to form the solution may range from about 20 to 50% by weight nitric acid with a 25 to 35% concentration being preferred. In making up the leach solution from about 2 to 5 parts of the aqueous nitric acid are mixed with one part of the raw leaching feed. This ratio will, of course, depend upon the concentration of the aqueous nitric acid leach used. A typical ratio would be 2.8 parts of aqueous nitric acid leach to one part of raw feed when a 29% nitric acid concentration is used. In any event, the amount of nitric acid required for leaching is that which is equivalent to from about 80 to 110% of the stoichiometric requirement based upon the alumina $$(Al_2O_3)$$

content of the leach feed.

The leaching step is carried out at atmospheric pressure and at a temperature ranging from about 80 to about 110° C. Leaching times will be controlled by the quantity and character of the leach feed and will generally range from 1.5 to 6 hours, with 2 to 4 hours being generally preferred.

After thorough agitation of the leaching solution to achieve as complete reaction of the aluminum with the nitric acid as possible, the resulting solution is filtered and the residue is discarded. This residue will contain, among other things, undissolved silica if clay was used as the original ore and it may be recycled into the original nitric acid leaching tank for further digesting.

The final filtrate which is a solution containing aluminum nitrate, $(Al(NO_3)_3 \cdot 9H_2O)$ in a concentration of about 38 to 44% by weight is then transferred to the next processing step, namely that of removing the residual iron which has gone into solution with the aluminum.

It should be noted at this point of the process that the nitric acid used in this leaching step is derived by recovering the off-gases from the fluidized bed used to decompose the aluminum nitrate. These off-gases are primarily oxides of nitrogen, excess oxygen, combustion products and moisture. These off-gases are converted to nitric acid by reaction with water in the nitric acid recovery system indicated in FIG. 2. The production and reuse of these off-gases will be discussed in greater detail in connection with the description of FIG. 4 below.

Removing residual iron from aluminum nitrate solution

Inasmuch as a small amount of the iron remaining in the leaching feed after magnetic separation will have gone into solution in the aqueous nitric acid, it is necessary to clean up this solution by removing this residual iron in order to provide a final $Al_2O_3$ product which is free of iron and which is suitable for introduction into a Hall electrolytic reducing cell, for example. This portion of the process is illustrated in FIG. 3.

The removal of the residual iron in the aluminum nitrate solution is conveniently accomplished by forming an organic iron complex to tie up the remaining iron values for removal. Since aluminum does not form such organic complexes it is possible to quantitatively remove the iron without any loss of aluminum to leave a pure aluminum nitrate solution.

Figure 3:
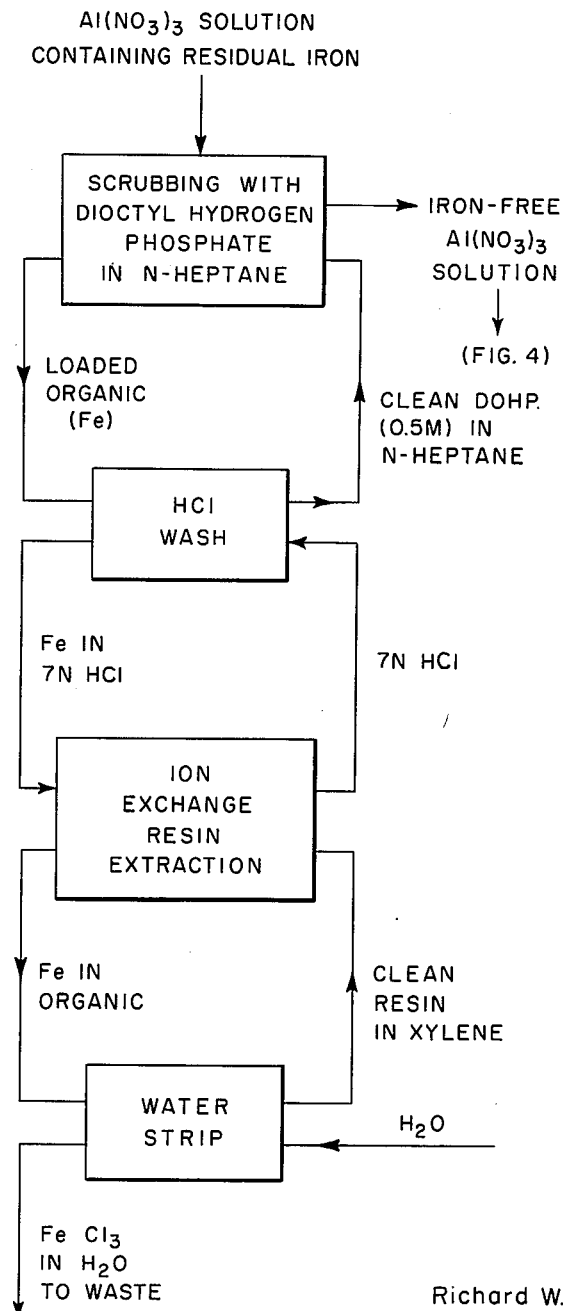
FIG. 3 is a flow diagram showing the removal of the residual iron from the aluminum leach solution.

The preferred method of scrubbing the aluminum nitrate solution to remove the residual iron is illustrated in FIG. 3. This scrubbing step uses dioctyl hydrogen phosphate in n-heptane. The scrubbing liquid is contacted with the aluminum nitrate solution in any suitable solvent-extraction equipment such as a countercurrent scrubbing tower, a continuous centrifugal extractor, a spray column, an RDX column or the like. The dioctyl hydrogen phosphate loaded with the organic iron is then washed with HCl and returned to the scrubbing tower. The scrubbed or iron-free aluminum nitrate solution is then available for decomposition in the fluidized bed as will be discussed below.

Returning to the scrubbing process, it will be seen in FIG. 3 that HCl is used to remove the iron from the scrubbing liquid, dioctyl hydrogen phosphate, by forming $FeCl_3$ and that it in turn is then introduced into an ion exchange resin system in which the $FeCl_3$ is extracted by stripping with water and discarded as waste $FeCl_3$. The clean ion exchange resin is then recycled, as is also the purified HCl into the HCl wash system.

The removal of iron ions from a strongly acidic solution of aluminum nitrate is the subject of a patent application Serial No. 213,482 filed July 30, 1962, in the names of James H. B. George and Ellery W. Stone and assigned to the same assignee as this application. In that application the removal of relatively small quantities of iron values from an aluminum nitrate solution is described in detail and reactants which may generally be defined as alkyl-substituted phosphoric acid having the formula $HRR'PO_4$ wherein R is alkyl containing at least 8 carbon atoms, R' is selected from the group consisting of hydrogen and alkyl are all shown to be satisfactory for transferring the iron values from the aqueous to the organic phase. Any of these liquid cation-exchange reagents as defined and illustrated in Serial No. 213,482 are satisfactory for use in the scrubbing step of the method of this invention, and it is meant to include all of these as defined within the scope of this invention. The dioctyl hydrogen phosphate is used in this description and in FIG. 3 as illustrative of this class of reagents. The iron-loaded dioctyl hydrogen phosphate may be recovered by several different routes, that shown in FIG. 3 being only illustrative.

Inasmuch as the aluminum nitrate solution is a strongly oxidizing medium the iron is substantially all in the trivalent state, the preferred extraction state. It is therefore necessary to use a form of organic ion exchange liquid capable of complexing the trivalent iron and which is unreactive with aluminum.

*Decomposition of aluminum nitrate*

Figure 4:
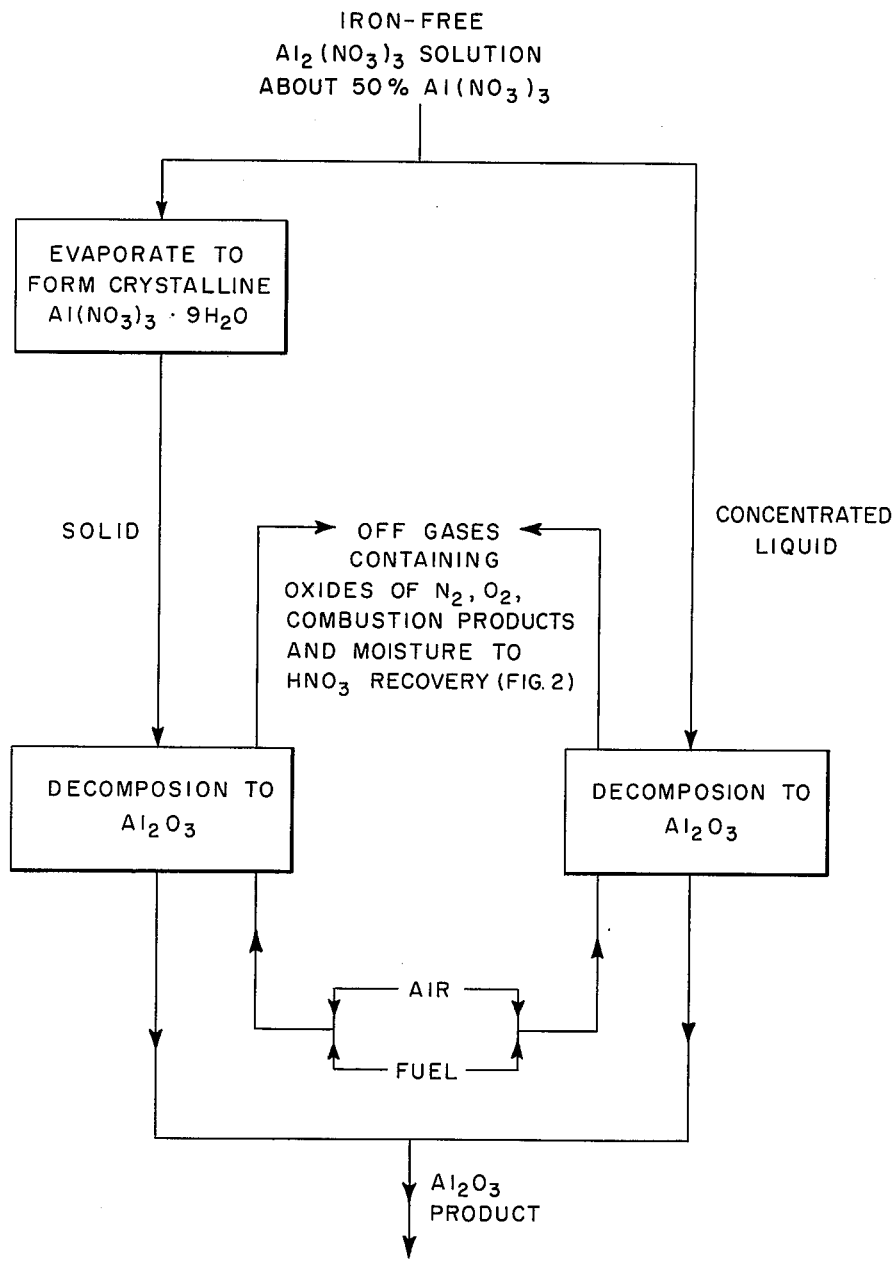
FIG. 4 is a flow diagram showing the recovery of the alumina.

The iron-free aluminum nitrate solution, which is about 50% $Al(NO_3)_3$, is now available for direct decomposition. This last process step is illustrated in FIG. 4. This decomposition step may be accomplished in any known manner, such as in a rotary kiln or other suitable apparatus. Decomposition in a fluidized bed is however preferred, and the application of this technique will be used in the following description to illustrate this step. It is to be understood, however, that this invention is not limited to carrying out the decomposition in a fluidized bed.

As in other steps of the process of this invention, two alternatives are offered. That is, the aluminum nitrate may first be evaporated to the crystalline (ennea hydrate) state before decomposition or it may be used directly as it is obtained from the scrubbing step.

If the solution is to be evaporated this may be accomplished in any standard evaporation equipment such as in multiple-effect evaporators or in submerged combustion evaporators. However, it is preferred to use the concentrated aluminum nitrate solution which results from the scrubbing step since the use of this material in the decomposition step results in the attainment of a more desirable structure in the final $Al_2O_3$ prills which are formed.

In decomposing the aluminum nitrate in the fluidized bed to pure $Al_2O_3$, the concentrated solution or the crystalline aluminum nitrate (ennea hydrate) is deposited on the surface of the aluminum oxide particles in the fluid bed, and is maintained in the fluidized state of suspension by the introduction of air and natural gas which are burned in the bed or below the bed to provide the necessary combustion gases. Oxidizing conditions are maintained by supplying air in excess to the fluidized bed. From about 5 to 20% excess air above the stoichiometric requirement is incorporated into the gas stream. The pressure prevailing in the fluidized bed during decomposition is essentially atmospheric and the gas flow rates, ranging between about 1.5 and 4 feet per second, are in keeping with typical fluidized bed operating conditions. The fluid bed temperature may range from about 300 to 600° C. with 400 to 500° C. being preferable.

The resulting $Al_2O_3$ particles after decomposition are discharged continuously by overflow from the reducing bed. The resulting $Al_2O_3$ is a highly pure material which is suitable for introduction into Hall electrolytic cells to be reduced to metallic aluminum.

In the decomposition of the aluminum nitrate in the fluidized bed, the by-product off-gases formed are essentially oxides of nitrogen, excess oxygen, combustion products and moisture. These gases are passed into a recovery system to be reacted with water to form the necessary aqueous nitric acid required in the leaching step (see FIG. 2). Thus once the process of this invention is underway it is necessary to supply only make-up nitric acid and make-up iron scrubbing liquid along with the fuel gases for the fluidized beds or other equipment used in the heating and decomposing steps.

From the above detailed description of this invention it will be seen that there is provided an economically feasible commercial process for recovering both aluminum and iron values from ferruginous aluminum-bearing ores in forms which are useable directly in further, well-known processing techniques. Thus the pure $Al_2O_3$ can be directly reduced to aluminum metal and the Fe or $Fe_3O_4$ used as described.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

We claim:
1. Method of recovering iron and aluminum values from a ferruginous aluminum-bearing ore containing less than about 3% iron, comprising the steps of
   (a) leaching said ore with aqueous nitric acid in which said nitric acid content ranges between 20 and 50% by weight, the quantity of nitric acid used being equivalent to between 80 and 110% of the stoichiometric requirement based upon the $Al_2O_3$ content of said ore;
   (b) filtering the resulting leach liquor to isolate the filtrate which comprises a solution of $Al(NO_3)_3 \cdot 9H_2O$ and residual iron values;
   (c) treating said filtrate with an organic cation-exchange complexing reagent specific to the iron ions in said filtrate and being a compound of the formula $HRR'PO_4$ wherein R is alkyl containing at least 8 carbon atoms and R' is selected from the group consisting of hydrogen and alkyl, thereby to transfer substantially all of said iron values from the aqueous phase of said filtrate to the organic phase of said complexing reagent and to form a substantially iron-free aluminum nitrate solution; and
   (d) decomposing said iron-free aluminum nitrate solution at elevated temperatures in an oxygen-containing atmosphere to form $Al_2O_3$ of sufficient purity to permit its direct reduction to aluminum metal.

2. Method in accordance with claim 1 wherein said complexing reagent is dioctyl hydrogen phosphate.

3. Method in accordance with claim 1 wherein said decomposing step is accomplished in a fluidized bed.

4. Method in accordance with claim 1 wherein said decomposing step is accomplished at a temperature between about 300 and 600° C. and at substantially atmospheric pressure.

5. Method of recovering iron and aluminum values from a ferruginous aluminum-bearing ore containing less than about 3% iron, comprising the steps of
   (a) calcining said ore at a temperature between about 700 and 850° C. thereby to break the aluminum-silicate bonding in said ore;
   (b) leaching the resulting calcined ore with aqueous nitric acid in which said nitric acid content ranges between 20 and 50% by weight, the quantity of nitric acid used being equivalent to between 80 and 110% of the stoichiometric requirement based upon the $Al_2O_3$ content of said ore;
   (c) filtering the resulting leach liquor to isolate the filtrate which comprises a solution of $Al(NO_3)_3 \cdot 9H_2O$ and residual iron value;
   (d) treating said filtrate with an organic cation-exchange complexing reagent specific to the iron ions in said filtrate and being a compound of the formula $HRR'PO_4$ wherein R is alkyl containing at least 8 carbon atoms and R' is selected from the group consisting of hydrogen and alkyl, thereby to transfer substantially all of said iron values from the aqueous phase of said filtrate to the organic phase of said complexing reagent and to form a substantially iron-free aluminum nitrate solution; and
   (e) decomposing said iron-free aluminum nitrate solution at elevated temperatures in an oxygen-containing atmosphere to form $Al_2O_3$ of sufficient purity to permit its direct reduction to aluminum metal.

6. Method in accordance with claim 5 wherein said calcining step is carried out in a fluidized bed.

7. Method of recovering iron and aluminum values from a ferruginous aluminum-bearing ore, comprising the steps of
   (a) calcining said ore at a temperature between about 700 and 850° C. in the presence of a reducing atmosphere thereby to break the aluminum-silicate bonding in said ore and to reduce the iron present to a magnetic form;
   (b) magnetically separating said iron from said ore thereby to form a calcined ore containing a small amount of residual iron;
   (c) leaching said calcined ore with aqueous nitric acid to form a leach liquor comprising a solution of $Al(NO_3)_3 \cdot 9H_2O$ and said residual iron;
   (d) filtering said leach liquor to isolate the filtrate;
   (e) treating said filtrate with an organic cation-exchange complexing reagent specific to the iron ions in said filtrate and being a compound of the formula $HRR'PO_4$ wherein R is alkyl containing at least 8 carbon atoms and $R_2$ is selected from the group consisting of hydrogen and alkyl, thereby to transfer substantially all of said residual iron values from the aqueous phase of said filtrate to the organic phase of said complexing reagent and to form a substantially iron-free aluminum nitrate solution; and
   (f) decomposing said iron-free aluminum nitrate solution at elevated temperatures in an oxygen-containing atmosphere to form $Al_2O_3$ of sufficient purity to permit its direct reduction to aluminum metal.

8. Method in accordance with claim 7 wherein the steps of calcining and decomposing are carried out in a fluidized bed.

9. Method in accordance with claim 7 wherein said iron during said calcining step is reduced to Fe.

10. Method in accordance with claim 7 wherein said iron during said calcining step is reduced to $Fe_3O_4$.

11. Method in accordance with claim 7 wherein said complexing reagent is a solution of dioctyl hydrogen phosphate in n-heptane.

12. Method in accordance with claim 7 further characterized by the step of crystallizing said iron-free aluminum nitrate prior to said decomposing step.

References Cited by the Examiner
UNITED STATES PATENTS

| | | | |
|---|---|---|---|
| 1,357,089 | 10/20 | Goldschmidt et al. | 23—141 |
| 1,792,410 | 2/31 | Buchner | 23—102 X |
| 1,873,642 | 8/32 | Guerther | 23—143 |
| 2,752,234 | 6/56 | Shipley | 75—1 X |
| 2,847,279 | 8/58 | Tucker | 23—102 |
| 2,860,031 | 11/58 | Grinstead. | |
| 3,055,754 | 9/62 | Fletcher. | |

FOREIGN PATENTS 469,061  7/37  Great Britain.

OTHER REFERENCES

A.P.C. application of Van Es et al., S.N. 426,648, published April 27, 1943.

MAURICE A. BRINDISI, *Primary Examiner.*